US005502310A

United States Patent [19]

Niestrath et al.

[11] Patent Number: 5,502,310

[45] Date of Patent: Mar. 26, 1996

[54] UV-RADIATING APPARATUS FOR IRRADIATING PRINTING INK ON ITEMS AND METHODS OF DRYING ITEMS WITH PRINTING INK THEREON

[75] Inventors: Hans-Dieter Niestrath, Hiddenhausen; Michael Voigt, Kirchlengern, both of Germany

[73] Assignee: Werner Kammann Maschinenfabrik GmbH, Germany

[21] Appl. No.: 253,521

[22] Filed: Jun. 3, 1994

[30] Foreign Application Priority Data

Jun. 5, 1993 [DE] Germany .......................... 43 18 735.8

[51] Int. Cl.[6] .................................................. G01J 1/00

[52] U.S. Cl. .................................... 250/492.1; 250/504 R

[58] Field of Search .............................. 250/493.1, 494.1, 250/504 R, 492.1

[56] References Cited

U.S. PATENT DOCUMENTS

| | | | |
|---|---|---|---|
| 3,733,709 | 5/1973 | Bassemir | 250/504 R |
| 3,819,929 | 6/1974 | Newman | 240/41.37 |
| 3,829,982 | 8/1974 | Pray | 34/4 |
| 3,831,289 | 8/1974 | Knight | 34/4 |
| 4,025,795 | 5/1977 | Lackore | 250/504 R |
| 4,048,490 | 9/1977 | Troue | 250/504 R |
| 4,592,276 | 6/1986 | Dubuit | 101/38 A |
| 4,644,899 | 2/1987 | Glaus | 250/504 R |
| 4,798,960 | 1/1989 | Keller et al. | 250/504 R |
| 5,166,523 | 11/1992 | Berghaeuser | 250/316.1 |
| 5,233,762 | 8/1993 | Müller et al. | 34/1 |

FOREIGN PATENT DOCUMENTS

| | | |
|---|---|---|
| 0222060 | 5/1987 | European Pat. Off. . |
| 2455458 | 6/1975 | Germany . |
| 3902643 | 12/1990 | Germany . |
| 4004511 | 8/1991 | Germany . |
| 4010191 | 10/1991 | Germany . |
| 1483803 | 8/1972 | United Kingdom . |
| WO93/02329 | 2/1993 | WIPO . |

OTHER PUBLICATIONS

Patent Abstracts of Japan, vol. 7, No. 287 (M264) 21 Dec. 1983 & JP–57 42592 (Toushiba Denzai K.K.) Sep. 1983.

Von Petar Jagrovic, *Technishe Rundschau*, "Raducre Europe '87", (1987) pp. 28–33.

*Primary Examiner*—Bruce C. Anderson
*Attorney, Agent, or Firm*—Seidel Gonda Lavorgna & Monaco

[57] ABSTRACT

An UV-radiating apparatus for irradiating printing ink on items such as individual articles or portions of material comprises a reflector housing divided into first and second parts in a direction parallel to the longitudinal axis of the radiation source of the apparatus. The two parts are each mounted pivotably about a respective axis parallel to the longitudinal axis of the radiation source between a first limit position in which the reflector housing is open at its side towards the item to be irradiated and a second limit position in which the parts of the reflector housing, with their regions towards the item, form between the radiation source and the path of transportation movement of the item a shield which shields the item from the radiation source. Upon stepwise transportation movement of individual items or a web of material the period of action of the rays on the respective item can be controlled by suitable actuation of the parts of the reflector housing.

15 Claims, 4 Drawing Sheets

UV-RADIATING APPARATUS FOR IRRADIATING PRINTING INK ON ITEMS AND METHODS OF DRYING ITEMS WITH PRINTING INK THEREON

BACKGROUND OF THE INVENTION

A procedure for applying one or more printing inks to material, for example material in the form of a web, includes a step of drying the printing ink or inks by means of UV-radiation. In one fore of UV-radiating apparatus, as is disclosed in DE-A-39 02 643, for irradiating printing inks on material in web fore which is continuously transported past the apparatus, it is possible for a reflector housing which is of a substantially two-part configuration to be pivoted in its entirety about an axis which is disposed in its interior and which extends parallel to the longitudinal axis of the radiation source, from an operative position into a waiting position in which the reflector housing shields the web of material from the radiation which is emitted from the radiation source. The aim of making the reflector housing rotatable in that way is to render redundant the usual flaps or shutter members which are generally disposed on the UV-radiating apparatus at the underside thereof and which are moved into a closed position, to prevent the web of material from being overheated by the heat radiation effect, whenever transportation of the web of material has to be interrupted. Although the above-described pivotable arrangement of the reflector housing makes it unnecessary to provide shielding flaps or shutters, it does however suffer from the disadvantage of requiring an extremely large amount of space as the reflector housing is pivoted in its entirety through an angle of 180°. In addition, the execution of such a pivotal movement on the part of the reflector housing takes up a certain amount of time so that such movement can only be produced in exceptional operational situations, such as for example when the web of material has come to a halt as mentioned above.

An UV-radiating apparatus which is of a somewhat different configuration and which is also employed for drying UV-responsive inks on material in web form is disclosed in EP-A-0 222 060. In this case also, to reduce the effect of the heat radiation on the web of material, the apparatus has a cold-light mirror as a reflector which reflects UV-rays but which allows a large part of heat rays to pass, which are then absorbed by some parts of the housing. The reflector housing of that apparatus is also of a substantially two-part configuration, the two halves of the reflector busing being adapted to be pivotable relative to each other. However that pivotability only serves to provide for focussing of the reflected radiation. Shielding of the material in web form, when the material is stopped, is effected by means of a shutter member which is closed when the web of material is stationary and thus shields the web of material from the radiation source.

An UV-radiating apparatus for drying printing ink is also disclosed in DE-A-22 35 047, including a reflector housing having side portions which are each pivotable about an axis parallel to the longitudinal axis of the radiation source, in such a way that in the one limit position they close the reflector housing at the underside thereof and thus shield the web of material relative to the radiation source when the web of material is stationary or when the speed of transportation movement thereof is too low. In that arrangement the middle part of the reflector housing is stationary so that it always remains in its stationary position. So that the heat which is generated when the reflector housing is in a closed condition can be suitably removed therefrom, cooling air is blown through the reflector housing. In addition, when the reflector housing is in the closed condition the radiation source is operated at a reduced power level in order to prevent overheating of the reflector housing which is still closed at its top side.

It will be seen that the above-discussed procedures, the content of which is appropriately incorporated hereinto by reference thereto, are concerned with printing on continuously transported material in web form. The web material which is provided with printing ink is shielded only whenever the web comes to a halt or is transported at an excessively slow speed. In all cases what is involved is preventing an excessively strong action on the part of the heat rays. As in normal operation the web passes the UV-radiating apparatus at an at least substantially constant speed, it is possible for the period for which the UV-rays act, and thus the metering thereof, as well as the period for which the long-wave heat rays act, to be influenced within certain limits by way of the speed of transportation movement of the web. The speed of movement of the web can be so selected that on the one hand overheating of the web as it moves in the region of the UV-radiating apparatus is avoided, while on the other hand the period for which the UV-radiation acts is adequate to dry or polymerize the printing ink.

However the need for drying printing ink by means of UV-radiation also arises in procedures involving printing on material which is transported with a stepwise movement. Such material may also involve material in web form which is advanced with a stepping movement, or individual articles such as bottles, CDs, and other hollow bodies. Under normal circumstances, in that situation also the arrangement is such that the UV-radiating apparatus or apparatuses is or are integrated into the actual printing machine, for example in such a way that an UV-radiating apparatus is arranged downstream of at least one printing station, as considered in the direction of transportation movement.

When dealing with individual articles, the procedure involved is generally such that a transportation means, for example a chain conveyor, which operates with a stepwise motion, is disposed beneath the UV-radiating apparatus. The transportation means moves the respective article or the respective web portion to be irradiated into a position beneath the UV-radiating apparatus, leaves it in that position for a certain period of time and, after termination of the appropriate treatment, moves it away with the next step in the transportation motion. At the same time the following article or web portion is moved into position beneath the radiating apparatus for irradiation thereby. In that respect the period of time for which the article is disposed beneath the UV-radiating apparatus can be fixed by the time which is required to achieve the desired effect, that is to say hardening or setting of the printing ink or inks, with a given level of radiation intensity. It will be noted however that, when a drying station which includes an UV-radiating apparatus is part of a larger piece of equipment, besides other treatment stations, for example in such a way that, in a printing machine, a drying station is disposed downstream of each printing station and thus the transportation means not only transports the articles through a drying station but also passes the articles in succession through a plurality of treatment stations for carrying out different treatments thereon, the duration of the residence time which arises out of the spacing in respect of time between two successive transportation steps of the transportation means, depends on the type of treatment which takes up the longest period of time. That may be the drying operation but in many cases it will be another treatment operation, for example the actual printing operation itself.

In other words, the situation is frequently such that it is the printing step that is crucial in regard to fixing the operating cycle of the printing machine and therewith the residence time of an article or a web portion in the drying station, that is to say generally beneath the UV-radiating apparatus. However the resulting residence time does not always have to correspond to the time which is the optimum time for carrying out the drying operation. In that respect it is to be borne in mind that the optimum duration of the drying operation is also dependent on a series of influencing parameters, for example the composition of the ink, but also the thickness of application of the printing ink, as when the ink is applied in a greater thickness, polymerization thereof under the effect of the UV-rays, with a given level of intensity thereof, may take a longer period of time than when the ink is applied in a thinner layer. That means that there is an optimum duration for the drying operation, for each print application. Moreover, in a machine for example for the production of multi-color printing, successive print applications may have different properties in regard to the necessary drying times, for example by virtue of the fact that printing inks are applied in different thicknesses in the individual printing stations of the machine. It will also be appreciated however that, when there is a change in the print image to be produced, which will occur whenever the material to be printed upon changes, the conditions involved for drying the individual printing ink applications may be completely different, and cannot be taken into consideration without particular measures being adopted, as for example it is generally not possible for the UV-radiating device to be switched on and off to set the drying time that represents the optimum duration for the respective application of printing ink to be dried.

Although the use of cold-light mirrors as reflectors for the UV-rays markedly reduces the degree of infra-red radiation which is reflected downwardly towards the article to be treated, the region which is beneath the radiation source, that is to say including the article to be treated, still suffers from a considerable degree of heating due to the residual infra-red radiation which is radiated from the radiation source downwardly on to the parts of the machine at that location, and on to the article to be treated. When dealing with certain articles that phenomenon can give rise to difficulties, for example when dealing with thin-wall bodies such as bottles or other containers in particular of thermoplastic material which suffer from deformation or other unacceptable changes in nature when certain temperature limits thereof are exceeded. For that reason, exceeding a given residence time under the action of the radiation source may be at least undesirable and can actually be harmful and detrimental. Therefore the important consideration is essentially that of limiting the residence time of the article to be treated under the effect of the radiation source to the period which is required for achieving the desired effect, especially as a rise in temperature of the surrounding area, for example the machine frame structure, in the region of the drying station, will also contribute to heating of the articles.

Furthermore however it is a desirable endeavour to limit the period for which the UV-rays act on the article or articles to be treated, to the period of time which is required to dry or polymerize the ink, irrespective of the fact that the articles are subjected to the effect of heat radiation. The wish to avoid UV-irradiation which goes beyond the required degree arises out of the fact that, if they act for an excessively long period of time, UV-rays can also cause undesirable changes in the article, for example in such a way that, under the action of the UV-rays, the color of the applied printing and possibly even the color of the article itself, for example if it is an article of plastic material which contains color pigments, also changes.

SUMMARY OF THE INVENTION

An object of the present invention is to provide an UV-radiating apparatus for irradiating printing ink on articles or web portions as they are transported past same, which makes it possible to meter the irradiation thereof in accordance with the respective requirements involved even if the articles are at least predominantly stationarily positioned in the region of the apparatus during the drying operation and it is therefore no longer possible to control the period of action of the radiation by way of the transportation speed.

Another object of the present invention is to provide an apparatus for irradiating with UV-radiation printing ink on an item transported past the apparatus, which is adapted to provide for optimum control of the period for which the UV-radiation acts on the articles or portions to be treated thereby.

A still further object of the invention is to provide an UV-radiating apparatus for irradiating printing ink on material transported therepast, which is adapted to reduce to the operationally possible minimum the period for which the inevitably occurring heat radiation acts thereon.

Yet another object of the invention is an UV-radiating apparatus for irradiating ink on material transported along a transportation path, which is operable to provide for accurate control of the irradiation effect using means of structural and operational simplicity and which take up a small amount of space so that they can be subsequently incorporated into already existing printing machines.

Still a further object of the invention is to provide an UV-radiating apparatus for irradiating inks on articles or portions of material, including means for removing the heat produced in the UV-radiating arrangement to an adequate degree under virtually all operating conditions which occur.

A still further object of the present invention is to provide a method of drying articles bearing printing ink using UV-radiation, which affords accurate control of radiation of the articles by means of a simple operating procedure which can be quickly carried into effect.

In accordance with the present invention the foregoing and other objects are achieved by an UV-radiating apparatus for irradiating printing inks on articles which in operation of the apparatus are transported along a transportation path past the apparatus. The apparatus includes a radiation source surrounded over a part of its periphery by a reflector housing which, at least at portions of its surfaces which are towards the radiation source, is adapted to absorb IR-radiation. It is provided with a cold-light mirror means which is arranged between the radiation source and at least a part of the IR-radiation-absorbing surfaces of the reflector housing. The reflector housing is divided into first and second parts in a direction at least substantially parallel to the longitudinal axis of the radiation source. The first and second parts are mounted within a main apparatus housing pivotably about respective axes extending at least substantially parallel to the longitudinal axis of the radiation source in such a way that in the one limit position of the first and second parts the reflector housing is open at its side towards the transportation path while in the second limit position of the first and second parts said parts with their regions towards said transportation path form between the radiation source and the transportation path a screening or shielding by which at least portions of the transportation path and articles or portions possibly disposed there are shielded or screened relative to the radiation source, the reflector housing being open at the side of the radiation source, which is remote from the transportation path.

In another aspect, in accordance with the present invention, the foregoing objects are achieved by a method of drying printing ink or inks on articles or portions of material using an UV-radiating apparatus having a subdivided reflector housing of which first and second parts are movable into a position in which said article or portion is screened or shielded from the radiation source. The article or portion is moved stepwise into the area of action of the UV-radiating apparatus and is transported further along the transportation path after a given period of time and the duration of irradiation is controlled by suitable positioning of the parts of the reflector housing.

In an alternative configuration of the method according to the invention for drying printing ink on an article or portion of material using an UV-radiating apparatus having a subdivided reflector housing of which first and second parts are .movable into a position in which the article or portion is shielded or screened relative to the radiation source, the article is moved stepwise into the region of action of the apparatus and by suitable positioning the parts of the reflector housing, at least during a part of the transportation movement, are pivoted into a position in which the transportation path and associated regions of the machine are shielded or screened from the radiation source.

Further objects, features and advantages of the invention will be apparent from the following description of a preferred embodiment.

DESCRIPTION OF THE PREFERRED EMBODIMENT

Figure 1:
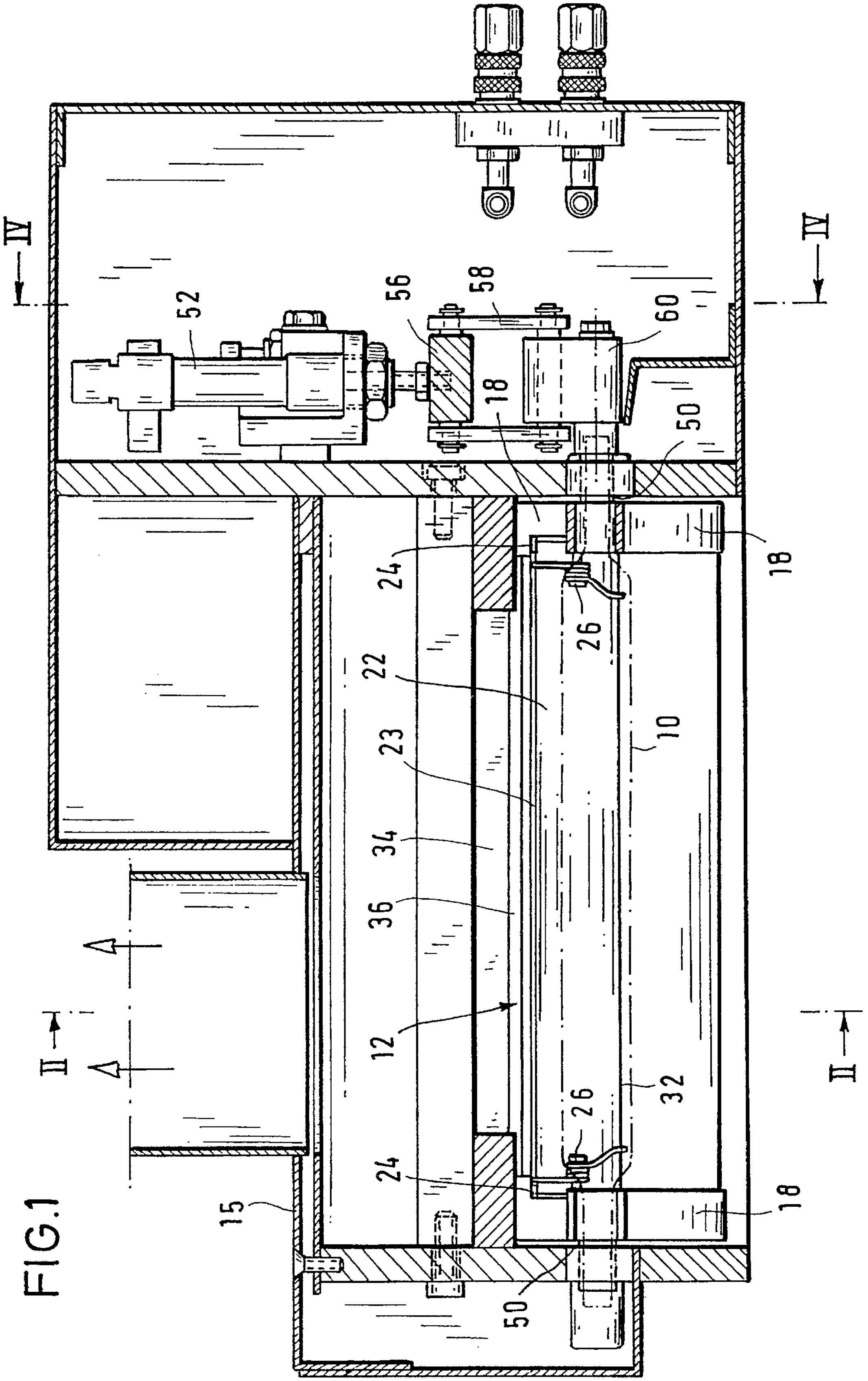
FIG. 1 is a view in longitudinal section through part of an apparatus according to the invention showing a busing containing an UV-radiation source.

Referring to the drawings, shown therein is an embodiment of an UV-radiating apparatus according to the invention for irradiating at least one printing ink on articles or portions of material, referred to herein for the sake of brevity as 'items'.

In the illustrated structure, reference numeral 15 denotes a main housing within which is arranged an elongate generally tubular radiation source 10 with a reflector housing generally indicated by reference numeral 12. The reflector housing 12 is subdivided symmetrically into first and second parts 14, 16 in a direction which is at least substantially parallel to the longitudinal extent of the radiation source 10, and thus the longitudinal axis thereof. Each of the parts 14, 16 is provided at each of its ends with a respective holder 18. Both holders may be of substantially the same structure and configuration. At its inside, that is to say at the side thereof which is towards the respective other holder 18, each holder 18 is provided with a seat 20 which extends in a substantially arcuate configuration and which serves to receive the respective end region of a cold-light mirror 22 which is also in the approximate shape of a quarter of a circle in cross-section. A pin 24 is disposed in the region of the upper end of each seat 20 for holding the cold-light mirror 22 and forms a stop for the edge region as indicated at 23 in FIG. 1 of the associated cold-light mirror 22 and thus determines the position of the cold-light mirror 22 within the respective seat 20. The length of the pin 24 approximately corresponds to the depth of the seat 20 on the holder 18.

Figure 2:
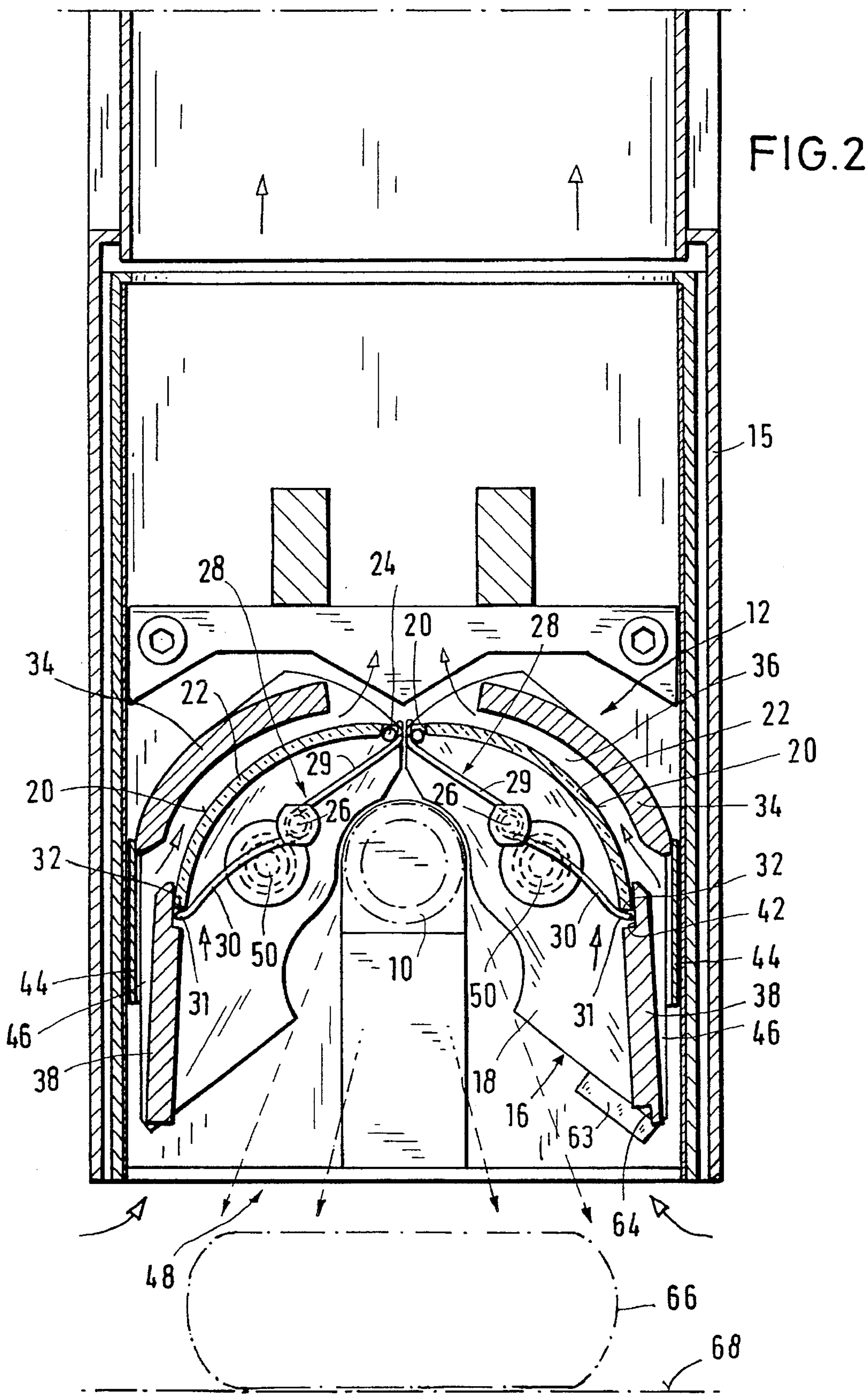
FIG. 2 is a view in section taken along line II—II in FIG. 1.

Disposed on each holder 18 at the inside thereof is a respective pin 26 which serves to support a two-armed spring 28 of which one arm 29 bears against the associated pin 24 while the other arm 30 engages with a bent-over end region as indicated at 31 in FIG. 2 under the lower longitudinal edge 32 of the cold-light mirror 22 and thus urges the cold-light mirror 22 in the direction in which the seat 20 extends, towards the pins 24, thereby to secure the respective cold-light mirror 22 in the appropriate position.

Reference numeral 34 in FIG. 2 denotes a flat component 34 of suitable material such as steel plate or the like, which is disposed between the two holders 18 of a respective part 14 and 16 of the reflector housing 12, substantially parallel to the respective cold-light mirror 22 at a spacing therefrom on the outside thereof. The component 34 is curved in such a way as to approximately correspond to the configuration of the cold-light mirror 22, as is clearly visible from both FIGS. 2 and 3. Outside the respective seat 20, the component 34 is connected for example by screws (not shown) to the two mutually facing end faces of the holders 18. The cold-light mirror 22 and the component 34 respectively define a passage as indicated at 36 in FIG. 3. The components 34 serve to absorb at least a part of the IR-rays which pass the respective cold-light mirrors 22.

Disposed approximately in line with each cold-light mirror 22 between the holders 18 of each part 14, 16 of the reflector housing 12 is a flat shielding portion 38 which extends more or less linearly downwardly from the respective cold-light mirror 22. The shielding portion 38 is at least substantially impermeable to IR-radiation, being for example a mirror-coated metal reflector which does not let infra-red radiation through. In the opened condition of the assembly, it serves to protect the outer main housing 15 from heating. In the closed condition of the assembly the shielding portions in the form of metal reflectors permit undesirable heating of the items as indicated at 66 on the transportation path 68, by infra-red radiation. In the closed position the rays are radiated substantially in the direction towards the upper reflector opening so that the heat generated can be removed without difficulty. Accordingly therefore each of the two reflector housing parts 14, 16 comprises two reflectors, more specifically on the one hand a cold-light reflector which is transmissive in respect of IR-radiation and a metal-mirrored reflector 38 which is non-transmissive in respect of IR-radiation. Further reference to the movement of the reflector housing parts 14 and 16 between the abovementioned closed position and an open position will be made below.

The shielding portion 38 is provided along its upper longitudinal edge with a longitudinally extending recess as indicated at 42 in FIG. 2, which is produced for example by milling and into which the lower longitudinal edge of the associated cold-light mirror 22 engages so that the lower edge region of the cold-light mirror 22 and the upper edge region of the shielding portion 38 overlap each other somewhat, as can be clearly seen for example from FIG. 2.

The two components 34 which serve to absorb heat rays are each provided at their lower edge with flat extension portions in the form of a respective strip 44 for example of sheet metal. The strips 44 are of a substantially flat configuration and, with the respective oppositely disposed shielding portion 38 and a part of the respective cold-light mirror 22, define a respective passage as indicated at 46 in FIGS. 2 and 3. The extent of the extension portions 44 in the longitudinal direction of the UV-radiation source 10 approximately corresponds to the length of the components 34.

The main housing 15 is connected to a blower (not shown) which gives rise to an air flow within the main housing 15. The air passes in through the lower opening 48 of the main housing 15 and flows away in an upward direction, as indicated by the respective arrows in FIG. 2. In that situation, air flows through the passages 36 and 46, irrespective of the position adopted by the two reflector housing parts 14 and 16. In that way a large part of the heat absorbed by the components 34, 38 and 44 is carried away with the air flow.

Each holder 18 is provided on its outward end face with a journal portion 50 which is mounted rotatably within the main housing 15. Also disposed in the main housing 15 is a compressed air piston-cylinder unit 52 whose piston is fixedly connected by way of a piston rod indicated at 54 in FIGS. 4 and 5 to a transverse carrier as indicated at 56 in for example FIGS. 1, 4 and 5 and to which two arms 58 are pivotably mounted. Each of the two arms 58 is pivotably connected to a respective lever 60 and each of the two levers 60 is in turn connected to one of the two journal portions 50 on respective ones of the two holders 18 which are shown at the right in the view of FIG. 1. By virtue of that configuration, actuation of the cylinder units 52 causes the two reflector housing parts 14 and 16 to be pivoted with a reciprocating movement between the two limit positions thereof as shown in FIGS. 2 and 4, and FIGS. 3 and 5 respectively.

Figure 3:
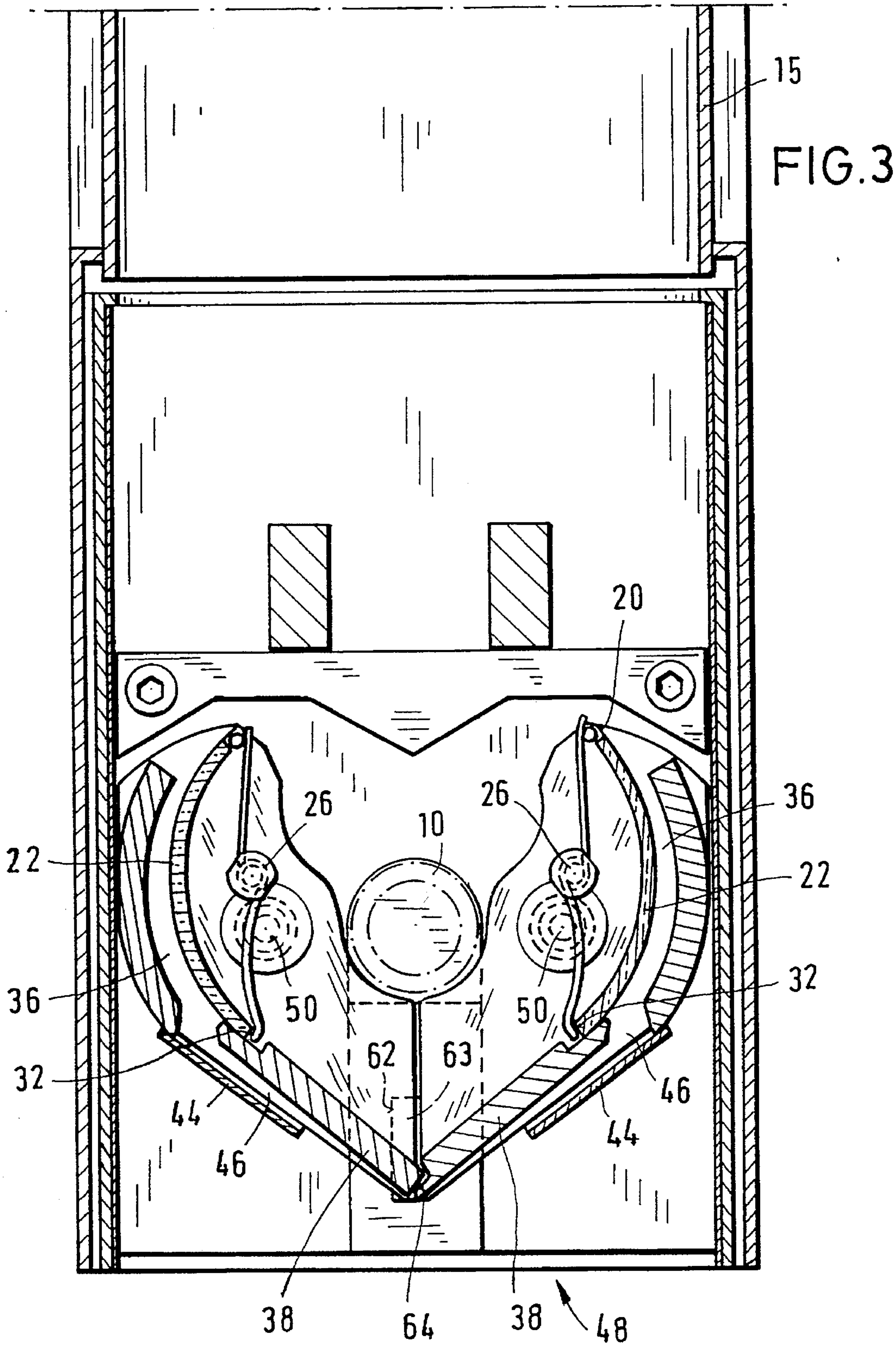
FIG. 3 is a view corresponding to that shown in FIG. 2 but in which parts of the reflector busing are in a different position.
Figure 5:
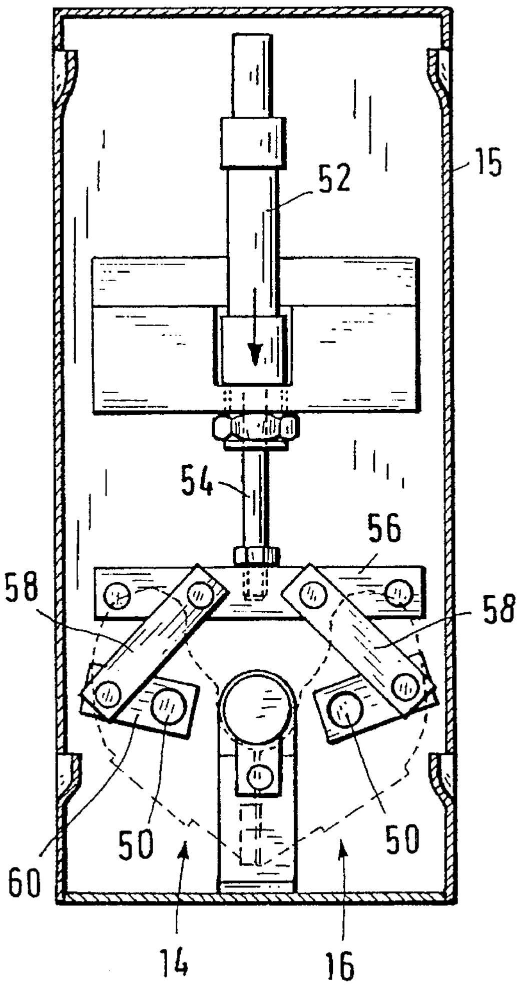
FIG. 5 is a view corresponding to FIG. 4 but in which the parts are in positions corresponding to those shown in FIG. 3.
Figure 4:
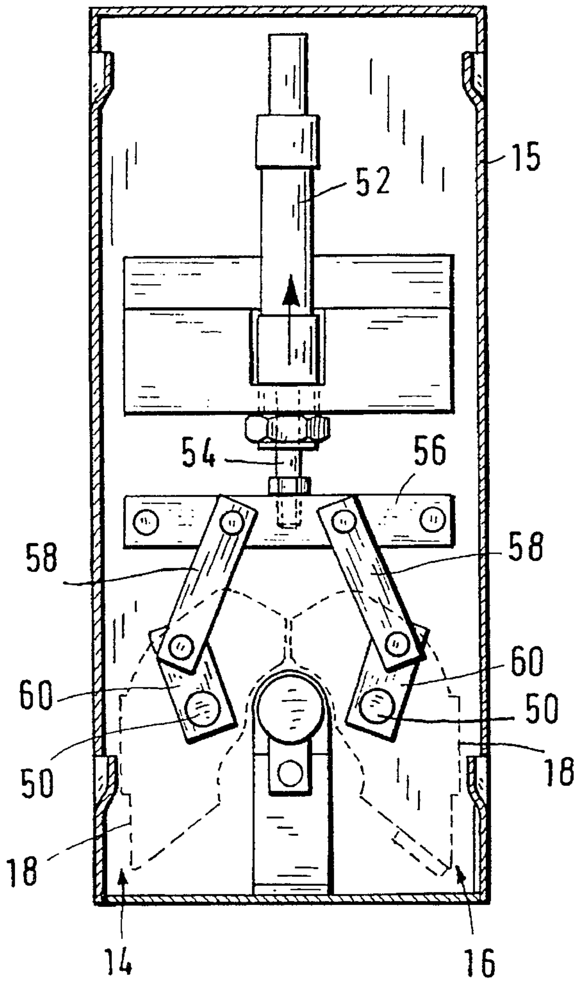
FIG. 4 is a view in the direction indicated by the arrows IV—IV in FIG. 1.

In the position shown in FIGS. 2 and 4 the reflector housing 12 is open at its underside. In the other limit position as shown in FIGS. 3 and 5 the reflector housing 12 is closed at its underside by virtue of the two shielding portions or plates 38 and the housing parts or holders 18, while the reflector housing 12 is open upwardly. To provide a closure effect which is as radiation-sealed as possible the holders 18 of the two housing parts 14 and 16 are of a somewhat different configuration in such a way that one of the two mutually oppositely disposed parts which co-operate in the closed position is provided with a recess 62 while the other holder 18 has a projection 63 of corresponding configuration which engages into the recess 62 in the closed position of the assembly. A corresponding consideration also applies in regard to the two shielding portions or plates 38, of which one is provided along its lower edge with a recess 64 which is produced for example by milling and into which engages the lower edge region of the other shielding portion or plate 38, in the closed position of the parts 14 and 16. The recess 62 is shown in FIG. 3.

The items of which one is indicated at 66 in FIG. 2 which are provided with at least one printing ink and which are to be exposed to the effect of the UV-radiation are moved along a transportation path represented by a transportation means 68 which operates with a stepwise movement, into the region beneath the opening 48 of the main housing 15, where they are exposed to the radiation from the radiation source 10, with the reflector housing 12 open downwardly. As the piston-cylinder unit 52 can be actuated as desired, that is to say independently of the step-wise forward transportation movement of the items 66, which is produced by operation of the transportation means 68, it is readily possible by suitable closing and opening of the reflector housing 12 and more specifically the parts 14 and 16 thereof to determine the period of time during which the respective item such as an individual article or portion of material, which is disposed beneath the UV-radiating apparatus, is exposed to the radiation. In that way it is readily possible to fix the duration of the irradiation step irrespective of the working rhythm of the transportation means 68.

Furthermore it is also possible to close the reflector housing 12 during the stepping transportation movement, that is to say to move the parts 14 and 16 of the reflector housing 12 into the position shown in FIGS. 3 and 5 in order thereby to reduce the period of time during which the regions of the machine, transportation means etc, disposed beneath the UV-radiating apparatus, are exposed to the radiation, to the extent which is required to achieve the desired aim, namely drying the printing ink or inks.

It will be noted from for example FIG. 2 that the arrangement of the apparatus according to the invention is of a generally symmetrical configuration, insofar as the reflector housing 12 which is divided into the first and second parts 14 and 16 is divided substantially in half, while the pivot axes of the first and second parts of the reflector housing, which axes extend at least substantially parallel to the longitudinal axis of the radiation source, are disposed substantially in a plane passing through the radiation source 10. The reflector housing parts 14 and 16 and the cold-light mirrors 22 are similarly of a curved configuration about an axis extending at least substantially parallel to the longitudinal axis of the radiation source 10, with the housing parts 14 and 16 and the cold-light mirrors 22 being at least substantially parallel to each other.

It will be seen from the foregoing therefore that the apparatus and method in accordance with the present invention provide for metering or controlling irradiation of articles or portions of material in accordance with the respective requirements even if the articles or portions are at least predominantly stationarily positioned in the region of the UV-radiating apparatus during the drying operation, so that it is not then possible to control the period of action of the radiation, by way of the speed of transportation movement of the articles or portions. More specifically the period of time during which the articles or portions are respectively exposed to the radiation from the UV-radiation source can be adjusted having regard only to the requirements arising out of the factors related to the application of the printing ink or inks and drying thereof. The period of action of the radiation can thus be set independently of the working rhythm of the machine, the duration of treatment operations in other treatment stations of the machine, in particular the printing station or stations, and irrespective of other operational factors and requirements which are not related to the drying process. The optimum period of action is in that respect determined under normal circumstances by the dosage of UV-rays required for the drying operation. As a result, at the same time the period of action of the heat rays which inevitably occur can be reduced to the operationally possible minimum.

It will be noted moreover that the configuration of the UV-radiating apparatus according to the invention makes it possible to keep the masses which have to be moved upon pivotal displacement of the parts 14, 16 of the reflector housing 12, relatively small. The distances by which the parts 14, 16 of the reflector housing have to be moved are relatively short so that it is possible for the parts of the reflector housing to be moved between their one limit position in which the reflector housing 12 is open at its side towards the transportation path 68 and the second limit position in which the parts 14, 16, with their regions towards the transportation path 68, form the shielding between the radiation source 10 and the transportation path, for the purposes of adjusting the period of action of the radiation, in short intervals of time, for example in accordance with the operating cycle of the machine. Those movements can be controlled in dependence on time, for example in accordance with a specified program. It is however also possible for the movements to be controlled in dependence on the transportation stepping motions of the apparatus or the operating cycle of the machine. It is always possible for the action of the radiation on an article or portion of material to be begun at a specific time and terminated at a specific time. It is possible therefore for the rays to be caused to act only on the printed surface of an article which is held in a suitably oriented position relative to the radiation source so that it is possible in that way to prevent uncontrolled partial irradiation or excessive irradiation while the article or portion is being fed to or transported away from the region of the apparatus. It is thus possible for the time during which an article or portion is shielded relative to the radiation source of the apparatus to be longer than the time during which the article or portion is subjected to the action of the radiation.

It will be appreciated that the provision of the passages referred to above, for an air flow, mean that heat generated in the apparatus can be adequately removed under virtually all operating conditions which fall to be considered. The design configuration of the apparatus in accordance with the invention therefore guarantees that, even when the reflector housing 12 is closed downwardly, all parts of the apparatus are adequately cooled by the air flowing through the arrangement, especially as, when the reflector housing 12 is closed downwardly, it is open upwardly and the air can flow away unimpededly at that location. Accordingly, as it passes through the reflector housing 12, the air is so passed through passages defined by components of the parts 14, 16 of the reflector housing 12 that, even with the reflector housing 12 in the condition of being closed downwardly, the heat is removed from the components of the apparatus to an adequate degree by virtue of the flow of cool air. There is accordingly no need for the power level of the radiation source to be reduced during the period of operation during which the reflector housing 12 is closed at the underside.

It will be appreciated that the above-described apparatus and method in accordance with the principles of the present invention have been set forth solely by way of example and illustration thereof and that various modifications and alterations may be made therein without thereby departing from the spirit and scope of the invention.

What is claimed is:

1. An UV-radiating apparatus for irradiating printing ink on items which in operation are transported along a transportation path past the apparatus, comprising a housing, within the housing a radiation source, a reflector housing surrounding the radiation source over a part of its periphery and adapted to absorb IR-radiation at least over a portion of its surfaces which are towards the radiation source, the reflector housing being divided into first and second parts in a direction at least substantially parallel to the longitudinal axis of the radiation source, cold-light mirror means between the radiation source and at least a part of the IR-radiation-absorbing surfaces of the reflector housing, wherein the first part and second part of said reflector housing are provided with first and second holders at respective ends thereof, fixing means on the first and second holders for mounting at least one cold-light mirror which is disposed in each said reflector housing part towards the radiation source and spaced from said reflector housing part, and means mounting said first and second parts of the reflector housing within said housing pivotably about respective axes extending at least substantially parallel to the longitudinal axis of the radiation source between a first limit position in which the reflector housing is open at its side towards the transportation path and a second limit position in which said parts of the reflector housing with their regions towards the transportation path form between the radiation source and the transportation path a shielding means by which at least a portion of the transportation path and an item possibly disposed thereon is shielded relative to the radiation source, the reflector housing then being opened at the side of the radiation source which is remote from the transportation path.

2. Apparatus as set forth in claim 1 wherein the reflector housing is divided substantially in half.

3. Apparatus as set forth in claim 1 wherein the pivot axes of the first and second parts of the reflector housing are disposed in a plane which at least substantially passes through the radiation source.

4. Apparatus as set forth in claim 1 further comprising at least one housing portion which is adapted to absorb IR-radiation at its side towards the radiation source connecting together the first and second holders.

5. Apparatus as set forth in claim 4 wherein each reflector housing part and each cold-light mirror are of a curved configuration about an axis extending at least substantially parallel to the longitudinal axis of the radiation source and between the first and second cold-light mirrors of the reflector housing.

6. Apparatus as set forth in claim 5 wherein each said reflector housing part and cold-light mirror extend at least substantially parallel to each other.

7. Apparatus as set forth in claim 5 wherein each cold-light mirror is curved in a substantially arcuate confirmation and wherein said first and second holders of each said reflector housing part are provided at their mutually facing sides with a respective seat means for said cold-light mirror, said seat means having first and second ends, and further including at the first end of the seat means an abutment means for one longitudinal edge of the respective cold-light mirror, and at the second end of the seat means a holding means releasably disposed on the respective holder and operable to engage the oppositely disposed edge of the cold-light mirror, which extends at least. substantially parallel to said axis of the radiation source.

8. Apparatus as set forth in claim 7 wherein each of the first and second holders is provided at the side towards the respective oppositely disposed holder with a projection, and including a two-armed spring carried on the projection, one arm of which spring engages in a prestressed condition behind the longitudinally extending edge of the respective cold-light mirror.

9. Apparatus as set forth in claim 7 wherein said abutment means determining the position of the cold-light mirror is disposed at the end that is remote from the transportation path of the seat means for the cold-light mirror and the holding means engages behind the longitudinally extending edge of the cold-light mirror that is towards the transportation path.

10. Apparatus as set forth in claim 4 and further including a respective shielding portion at least substantially impermeable to IR-radiation and arranged at each reflector housing part between the first and second holders in the regions thereof towards the transportation path, said shielding portion being of such a dimension in regard to its extent transversely to the longitudinal axis of the radiation source that the shielding portions of the reflector housing parts are arranged in the second limit position of the latter in the region between the radiation source and the transportation path.

11. Apparatus as set forth in claim 10 wherein the shielding portions are mirrored at their side towards the radiation source.

12. Apparatus as set forth in claim 10 wherein the shielding portions are substantially flat in cross-section.

13. Apparatus as set forth in claim 10 wherein each shielding portion at least substantially adjoins the respective seat means for the cold-light mirror.

14. Apparatus as set forth in claim 10 including at least one extension means extending said housing portion towards the transportation path and disposed at a spacing from the cold-light mirror and the shielding portion.

15. An UV-radiating apparatus for irradiating printing ink on items which in operation are transported along a transportation path past the apparatus, comprising:

a housing, a radiating source within the housing, a reflector housing surrounding the radiation source and adapted to absorb IR-radiation at least over a portion of its surfaces, wherein the reflector housing is divided into first and second parts in a direction substantially parallel to the longitudinal axis of the radiation sources, means for pivotably mounting said first and second parts of the reflector housing within said housing such that the first and second parts of the reflector housing pivot between a first limit position in which the reflector housing is open towards the transportation path and a second limit position in which said first and second parts of the reflector housing are in contacting engagement between the radiation source and the transportation path and in which the reflector housing is open at the side of the radiation source remote from the transportation path, cold-light mirror means between the radiation source and at least a part of the IR-radiation-absorbing surfaces of the reflector housing, and shielding means forming a portion of the reflector housing and positioned at the ends of the first and second housing parts towards the transportation path, a portion of the transportation path and item disposed thereon being shielded relative to the radiation source by the shielding means in the second limit position of the reflector housing.

* * * * *